US006442290B1

(12) United States Patent
Ellis et al.

(10) Patent No.: US 6,442,290 B1
(45) Date of Patent: Aug. 27, 2002

(54) METHOD AND APPARATUS FOR PROCESSING PARTIAL LINES OF SCANNED IMAGES AND COMMUNICATING ASSOCIATED DATA OVER A NETWORK

(75) Inventors: Matthew E. Ellis, Waukesha, WI (US); Matthew W. Turek, Glenville, NY (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/473,244

(22) Filed: Dec. 27, 1999

Related U.S. Application Data (63) Continuation-in-part of application No. 09/116,683, filed on Jul. 16, 1998.

(51) Int. Cl.$^7$ ................................................. G06K 9/00
(52) U.S. Cl. ........................ 382/132; 382/202; 382/193; 382/128; 711/200
(58) Field of Search ................................. 382/132, 202, 382/193, 296, 298, 128; 358/459; 345/186, 126; 395/311; 711/200, 147, 154

(56) References Cited

U.S. PATENT DOCUMENTS

| | | | | |
|---|---|---|---|---|
| 5,067,019 A | * | 11/1991 | Judy et al. ................... 358/160 |
| 5,113,453 A | * | 5/1992 | Simon ........................... 382/24 |
| 5,164,996 A | * | 11/1992 | Pastor .......................... 382/25 |
| 5,221,971 A | * | 6/1993 | Allen et al. .................. 358/459 |
| 5,487,118 A | * | 1/1996 | Melen .......................... 382/202 |
| 5,734,915 A | * | 3/1998 | Roewer ....................... 395/773 |
| 5,949,409 A | * | 9/1999 | Tanaka ......................... 345/186 |
| 5,966,116 A | * | 10/1999 | Wakeland .................... 345/126 |

* cited by examiner

*Primary Examiner*—Leo Boudreau
*Assistant Examiner*—M. Choobin
(74) *Attorney, Agent, or Firm*—Fletcher, Yoder & Van Someren

(57) ABSTRACT

A method for processing partial lines of image data from a detector, each partial line of data representing a portion of an image pixel matrix, includes: (a) communicating partial lines of image data over a network from an imaging system to a remote facility; (b) receiving partial lines of image data in a first sequence; (c) assigning to each partial line of image data in a first series a position in a second sequence by reference to a plurality of base addresses; (d) altering the base addresses; and (e) assigning to each partial line of image data in a second series a position in the second sequence by reference to the altered base addresses.

20 Claims, 7 Drawing Sheets

| ELEMENT (60) | BASE ADDRESS (62) |
|---|---|
| 0 | BASE_0 |
| 1 | BASE_1 |
| 2 | BASE_2 |
| 3 | BASE_3 |

| ELEMENT (66) | OFFSET (68) |
|---|---|
| 0 | OFFSET_0 |
| 1 | − OFFSET_1 |
| 2 | OFFSET_2 |
| 3 | − OFFSET_3 |

| HALF-LINE COUNTER (72) | H-L STORAGE ADDRESS (74) |
|---|---|
| 0 | BASE_0 |
| 1 | BASE_1 |
| 2 | BASE_2 |
| 3 | BASE_3 |
| 4 | BASE_0 + OFFSET_0 |
| 5 | BASE_1 − OFFSET_1 |
| 6 | BASE_2 + OFFSET_2 |
| 7 | BASE_3 − OFFSET_3 |

METHOD AND APPARATUS FOR PROCESSING PARTIAL LINES OF SCANNED IMAGES AND COMMUNICATING ASSOCIATED DATA OVER A NETWORK

CROSS-REFERENCE TO RELATED APPLICATIONS

This application is a continuation-in-part (CIP) of U.S. application Ser. No. 09/116,683, entitled "Method and Apparatus for Processing Partial Lines of Scanned Images" by Matthew E. Ellis and Matthew W. Turek filed on Jul. 16, 1998.

BACKGROUND OF THE INVENTION

The present invention relates generally to the field of medical diagnostic systems, such as imaging systems. More particularly, the invention relates to a technique for converting half-lines of image pixel data to full-lines for subsequent processing and display.

Images generated by X-ray and other imaging systems are acquired in a variety of manners, depending upon the structure and configuration of the detecting subsystems. In general, a detector is employed for receiving image information divided into a matrix of pixels, which, together, define an overall image of interest. The matrix of pixels is commonly divided into rows which are scanned and analyzed sequentially or in a pre-established sequential pattern. The rows of pixels are then reassembled by processing circuitry to reconstitute the useful image, which may be displayed or printed for use by an attending physician or technician.

Various scanning formats and matrix sizes are commonly employed in X-ray and other image processing modalities. In a number of these techniques, the overall image is not only divided into rows of pixels, but each row is further subdivided into half-lines of pixels. For efficient processing of the image data, the half-lines of pixels may be detected and processed in various orders. For example, in a given matrix of image pixels, half-lines of pixel data may be acquired and processed beginning at upper and lower outer edges of the image and proceeding toward a center line of the image parallel to the half-lines of pixels. In other processing techniques, half-lines of pixel data may be processed from a center line of the overall image matrix, proceeding towards upper and lower edges. Moreover, half-lines of pixel data may also be acquired and processed progressively in sequential half-lines beginning at an upper corner of the image and continuing to an opposite lower corner.

Depending upon the pixel data acquisition sequence utilized, pixel data processed by the imaging system may arrive to signal processing circuitry in interlaced half-lines of data which must be sorted to produce a meaningful image. In particular, where alternating half-lines of data arrive from opposite upper and lower portions of an image, the half-lines of data must be sorted and grouped into adjacent full-lines proceeding from one side of the image to the other. In addition, the full-lines are arranged from an upper or lower edge of the image to the opposite edge to reproduce the arrangement of the pixels representative of the body or object scanned.

In addition to the sorting and reassociation functions performed on interlaced half-lines of image data, it is sometimes desirable to produce scanned image data having different matrix dimensions (i.e., rows of pixels by columns of pixels), depending upon the type of feature being imaged and the detail desired. Accordingly, circuitry employed for processing and sorting half-lines of pixel data would advantageously accommodate the variety of matrix formats envisioned.

Solutions to the problems described above have not heretofore included significant remote capabilities. In particular, communication networks, such as, the Internet or private networks, have not been used to provide remote services to such medical diagnostic systems. The advantages of remote services, such as, remote monitoring, remote system control, immediate file access from remote locations, remote file storage and archiving, remote resource pooling, remote recording, remote diagnostics, and remote high speed computations have not heretofore been employed to solve the problems discussed above.

Thus, there is a need for a medical diagnostic system which provides for the advantages of remote services and addresses the problems discussed above, In particular, there is a need for a medical diagnostic system where contiguous full lines of pixel data are obtained in real-time as the half-lines of data are transmitted over a network. Further, there is a need for processing and sorting half-lines of pixel data over a network for faster and more efficient data communication and image display at remote locations.

SUMMARY OF THE INVENTION

One embodiment of the invention relates to a method for processing partial lines of image data from a detector, each partial line of data representing a portion of an image pixel matrix. The method includes the steps of: (a) communicating partial lines of image data over a network from an imaging system to a remote facility; (b) receiving partial lines of image data in a first sequence; (c) assigning to each partial line of image data in a first series a position in a second sequence by reference to a plurality of base addresses; (d) altering the base addresses; and (e) assigning to each partial line of image data in a second series a position in the second sequence by reference to the altered base addresses.

Another embodiment of the invention relates to a method for processing a discrete pixel image, the image including a plurality of pixels disposed in an image pixel matrix. The method includes the steps of: (a) communicating the image pixel matrix over a network from an imaging system to a remote facility; (b) determining address values based upon dimensions of the image pixel matrix and a desired pixel scanning sequence; (c) generating a plurality of series of image data for pixels in the image pixel matrix; and (d) assigning to each series of image data a unique address value corresponding to a desired pixel output sequence.

Another embodiment of the invention relates to a system for processing partial lines of image data representative of discrete pixels in an image pixel matrix. The system includes a network for communication among at least one imaging system and at least one remote facility; a first memory circuit coupled to the network for storing operator configurable address values corresponding to a desired sequence of the partial lines of image data; a second memory circuit coupled to the network for storing the partial lines of image data in the desired sequence; and a signal processing circuit coupled to the network configured to assign to each partial line of image data an address value from the first memory circuit, and to store the partial lines of image data in the second memory circuit according to the assigned address values.

Other principle features and advantages of the present invention will become apparent to those skilled in the art upon review of the following drawings, the detailed description, and the appended claims.

BRIEF DESCRIPTION OF THE DRAWINGS

Preferred exemplary embodiments are described below with reference to the accompanying drawings, wherein like reference numerals denote like elements, and:

FIG. 4 is a base address table for assigning base addresses to half-lines of image data for the image illustrated in FIG. 2;

FIG. 5 is an offset table for applying relevant offsets to the base addresses of the table of FIG. 4;

FIG. 6 is an output memory address location table generated by reference to the base address table of FIG. 4 and the offset table of FIG. 5 for re-ordering the half-lines of image data from the scanned order of FIG. 2 to the order represented in FIG. 3;

DETAILED DESCRIPTION OF THE PREFERRED EMBODIMENT

Figure 1:
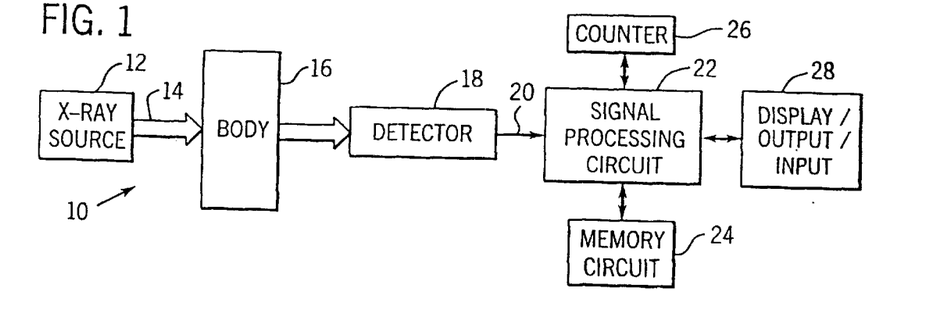
FIG. 1 is a diagrammatical representation of an X-ray imaging system including circuitry for acquiring and processing half-lines of image data.

Referring now to FIG. 1, the primary components of an imaging system 10 are illustrated as including an X-ray source 12 which is configured to emit a stream 14 of X-rays upon demand. The X-rays are directed to a body or subject 16. A portion of the X-rays pass through the body and impact a detector 18. Detector 18 is configured to isolate discrete picture elements or pixels and to generate signals representative of the intensity of the radiation impacting the detector within each pixel. These signals are transmitted from detector 18 as a data stream, represented by reference numeral 20, to a signal processing circuit 22.

Signal processing circuit 22 conditions the data received from detector 18, and refines the data to produce ordered data which can be interpreted by an attending physician or technician. Signal processing circuit 22 is coupled to a memory circuit 24 which, for the present purposes, serves to store partial lines of data for reconstitution of the image. Signal processing circuit 22 is also coupled to a counter 26 which aids in reordering data received from detector 18 as summarized below. A display/output/input station 28, typically including a monitor or printer and an input station, such as a keyboard, is coupled to signal processing circuit 22 for producing a reconstituted image which is available for interpretation by the attending physician or technician. The physician or technician may also input operational parameters into circuit 22 via station 28, such as the image matrix size and scanning pattern as discussed below. In general, such parameters may be input by selection of an image or application type or of a general examination configuration. It should be noted that signal processing circuit 22 and counter 26 may be defined as appropriate code in a general purpose or application-specific microprocessor or computer. Moreover, signal processing circuit 22 may perform functions in system 10 in addition to those described below, such as image processing, analysis and enhancement functions.

Figure 2:
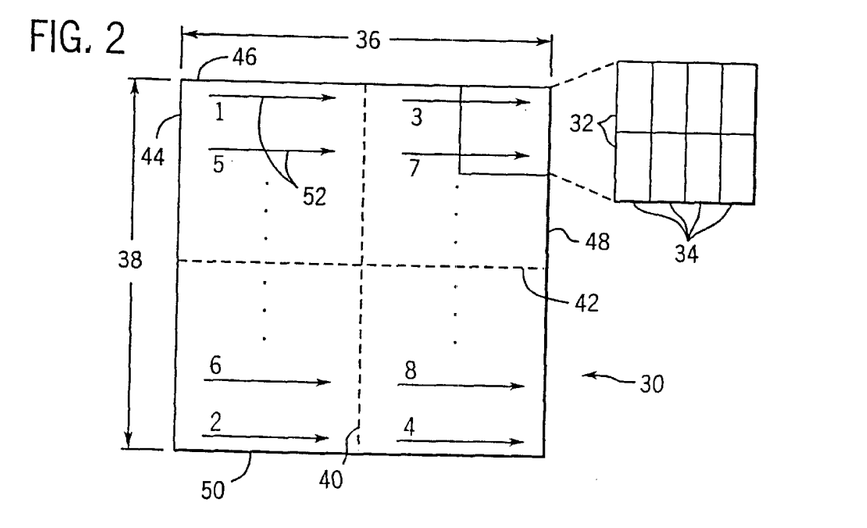
FIG. 2 is a diagrammatical representation of an X-ray image divided into half-lines of pixel data in accordance with an outside-to-inside scan mode.

FIG. 2 illustrates an image generated by system 10 in the form of an image pixel matrix 30. Matrix 30 includes a series of discrete pixels arranged in parallel rows 32 and parallel columns 34. The rows and columns of pixels form an overall image having a width 36 and a height 38. The particular dimensions of matrix 30 may be varied depending upon the type of tissue or subject being scanned, and the types of features of interest within the image. For example, matrix 30 may have dimensions of 2,048 pixels by 2,048 pixels as a standard format, or may have a smaller format 1,024 pixels by 1,024 pixels, such as for cardiac radiographs, or still different dimensions, such as 1920 pixels by 2304 pixels for mammograms.

In addition to accommodating various matrix or image sizes, system 10 may be configured to scan pixel data collected by detector 18 in various modes. In particular, the modes may subdivide matrix 30 into regions defined by a vertical center line 40 and a horizontal center line 42. Within these regions, scanning may progress in accordance with the predefined modes. For example, in the embodiment illustrated in FIG. 2, scanning begins at a left edge 44, adjacent to an upper edge 46. Scanning then progresses from left edge 44 in the direction of a right edge 48. Subsequent data is scanned beginning from left edge 44, adjacent to a lower edge 50, proceeding from left edge 44 in the direction of right edge 48. The information scanned within the regions defined by the edges and the center lines form half-lines of pixel data, designated by reference numeral 52 in FIG. 2. Each half-line of pixel data includes signals or values representative of the intensities within adjacent pixels in a row across matrix 30.

In one scanning mode illustrated in FIG. 2, which may be referred to as an outside-to-inside scanning mode, a first half-line of pixel data, designated "1" is scanned in an upper left position in matrix 30. The subsequent half-line of pixel data, designated "2" extends along a lower left corner of matrix 30. Due to the configuration of detector 18, the subsequent half-line "3" of pixel data extends from center line 40, adjacent to upper edge 46, toward right edge 48. Next, a half-line "4" of pixel data is scanned from center line 40 adjacent to lower edge 50, in the direction of right edge 48. In this mode, scanning proceeds in accordance with the foregoing order until the rows of matrix 30 adjacent to horizontal center line 42 have been scanned.

It should be noted that the information received from detector 18 by signal processing circuit 22 may not only include interlaced half or partial-lines of pixel data, but may include data in which pixels of partial lines are further interlaced. However, the technique described below proceeds based upon partial-lines in which individual pixels have been pre-sorted to form contiguous sequences or series of pixel data defining half-lines, or more generally, partial-lines. Moreover, it should be noted that the technique described herein is not limited to the particular scanning sequence illustrated in FIG. 2. Rather, the technique may be applied to partial-lines of pixel data scanned in both symmetrical and asymmetrical patterns, and in outside-to-inside sequences, inside-to-outside sequences, or in progressive scanning sequences. The particular scanning mode or sequence, and the particular matrix size may be configured as parameters recognizable by signal processing circuit 22 which may be input by an operator or technician via display/output/input station 28 (such as by selection of an image or examination type as mentioned above).

Figure 3:
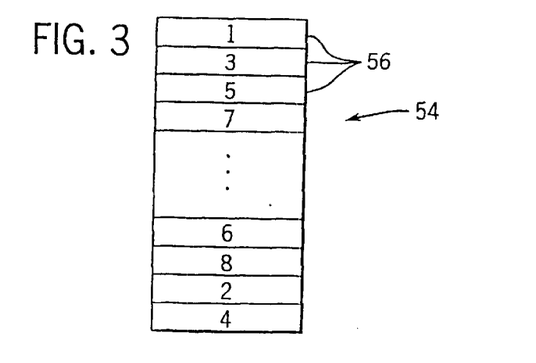
FIG. 3 is a diagrammatical representation of a re-ordered sequence of half-line data for the image of FIG. 2, properly sorted to reconstitute the image.

Referring again to FIG. 2, depending upon the scanning sequence selected, it will be apparent that the partial-lines of pixel data received by signal processing circuit 22 will not correspond to the proper ordering of the data in a reconstituted image matrix 30. To permit the data to be reordered for presentation in a reconstituted image, signal processing circuit 22, in conjunction with memory circuit 24 and counter 26, organizes the partial-lines of data in an appropriate sequence as illustrated in FIG. 3. This reordered sequence 54 may be conveniently configured in memory circuit 24 by assigning unique addresses 56 to the individual partial-lines of data. The sequence 54 illustrated in FIG. 3 corresponds to the appropriately ordered half-lines of pixel data illustrated in the scanning sequence of FIG. 2. The reordered sequence thus permits contiguous full lines of pixel data to be defined for subsequent processing and display.

FIGS. 4, 5, and 6 illustrate an exemplary technique employed by signal processing circuit 22 for reordering the half-lines of pixel data of FIG. 2 into the desired sequence 54 of FIG. 3. In particular, FIG. 4 represents a base address table 58 stored within memory circuit 24. Base address table 58 includes data associating specific element numbers 60 to base addresses 62. FIG. 5 represents an offset table 64, also stored within memory circuit 24, and associating element numbers 66 with offset values 68. FIG. 6 represents a half-line storage address table 70, generated by reference to base address table 58 and offset table 64 as described below.

Figure 7:
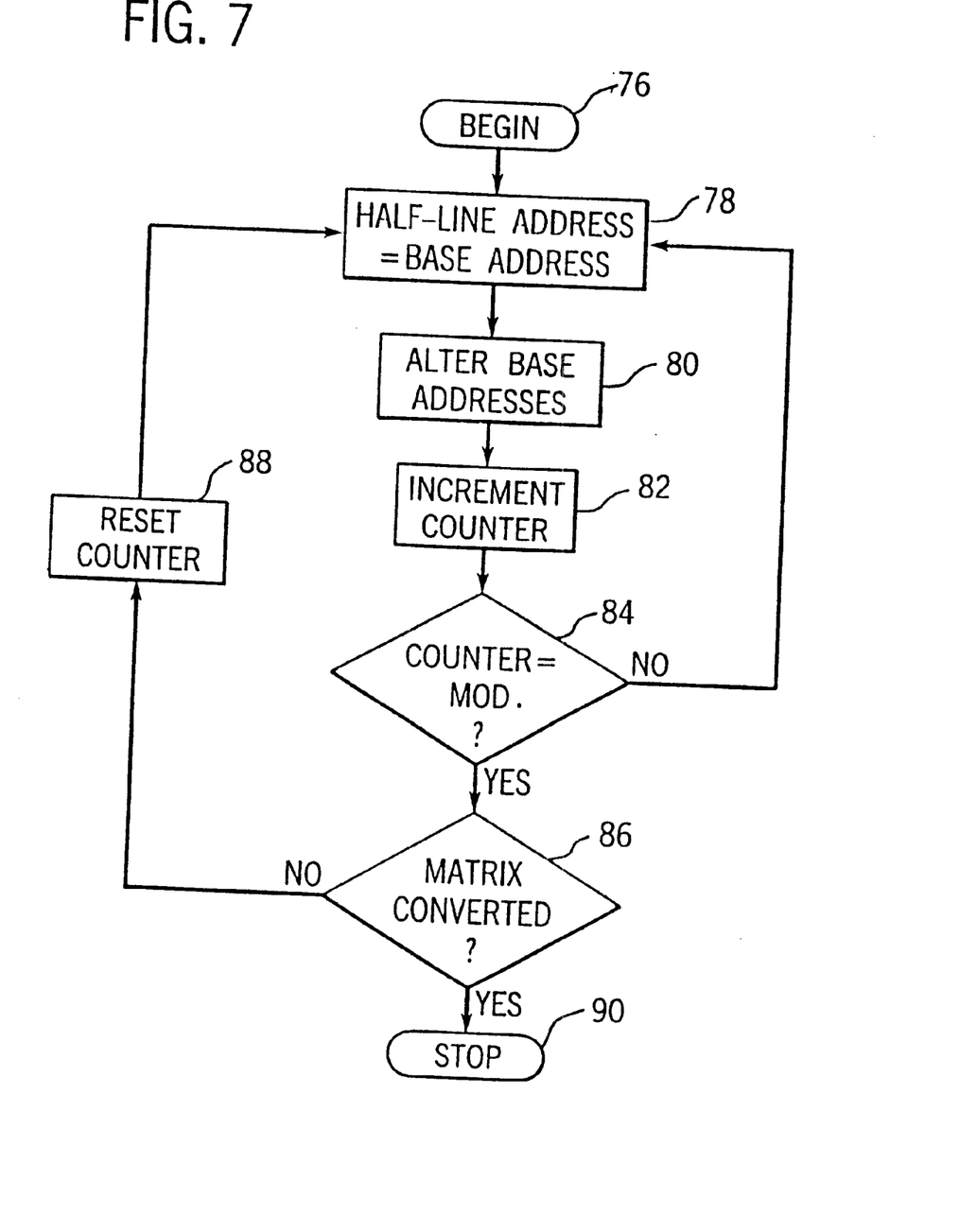
FIG. 7 is a flow chart illustrating exemplary control logic for reordering partial-lines of image pixel data for subsequent storage and processing.

To determine the half-line storage addresses 74 of table 70, signal processing circuit 22 executes control logic designed to assign unique addresses to each partial-line of image data. This logic may proceed by combining the base storage addresses of table 58 with offsets of table 64. Exemplary steps in such control logic are illustrated in FIG. 7. As shown in FIG. 7, the control logic begins at step 76 and proceeds to step 78 where the first half-line storage address is assigned to the first element by setting the half-line storage address equal to the corresponding base address of table 58. Hence,. the first half-line storage address receives a value of BASE_0.

Thereafter, circuit 22 proceeds to step 80 where the assigned value from the base address table 58 is altered by combining the original base address with an offset of table 64. In the illustrated embodiment, programming code may be provided to reassign each base address value 62 a new value corresponding to the previous value plus the offset for the corresponding element found in table 64. Thus, following step 80, in the illustrated embodiment, as elements 0–3 of table 58 are assigned to data, these will be sequentially altered to contain values of BASE_0+OFFSET_0, BASE_1OFFSET_1, BASE_2+OFFSET_2, and BASE_3-OFFSET_3, respectively.

Following step 80, counter 26 is incremented as illustrated at step 82. At step 84 signal processing circuit 22 determines whether the counter value has reached a predetermined modulus value. In the illustrated example, a modulus value of 4 is used due to the four quadrants defined by center lines 40 and 42 in matrix 30 (see FIG. 2). So long as the counter value has not reached the modulus value, circuit 22 returns to step 78 to assign the next base address value from table 58 to the subsequent half-line of pixel data.

Once the modulus value is attained by the counter 26, circuit 22 proceeds to step 86 where it is determined whether the entire matrix has been converted. This step may be performed by reference to half-line counter values as denoted by reference numeral 72 in FIG. 6. The total number of half-line counter values will correspond to the number of partial lines within the image matrix 30, in turn dependent upon the dimensions 36 and 38 of the matrix (see FIG. 2) and the selected scanning mode or sequence.

When the response at step 86 is negative, circuit 22 proceeds to step 88 where counter 26 is reset. Thereafter, circuit 22 returns to step 78 to assign the next group of half-line pixel data the altered addresses then stored in table 58. This control logic proceeds until the entire matrix 30 has been converted, and is thereafter exited, as noted at step 90.

Although half-line storage addresses 74 may be associated with the pixel data to provide for reordering of the data, each set of pixel data is preferably stored in the memory circuit 24 in an address location corresponding to that dictated by table 70. It should also be noted that, while the foregoing technique reference has been made to tabulated data, those skilled in the art will readily appreciate that the addresses, offsets and resulting storage addresses could either be embodied in look-up tables as described, or could be embedded in appropriate code executed by signal processing circuit 22.

Figure 8:
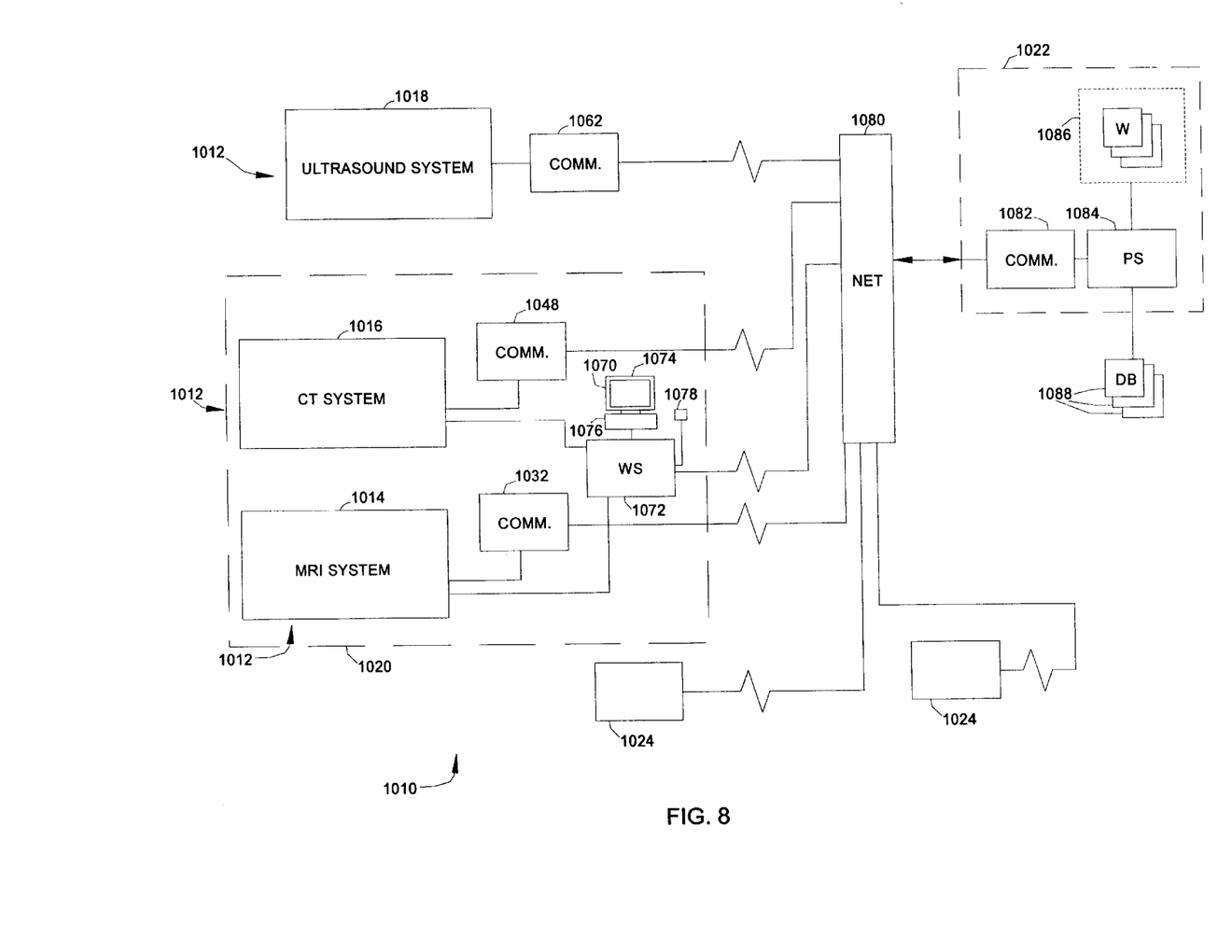
FIG. 8 is a diagrammatical representation of a series of medical diagnostic systems coupled to a service facility via a network connection for providing remote services and data interchange between the diagnostic systems and the service facility.

Referring now to FIG. 8, a service system 1010 is illustrated for providing remote service to a plurality of medical diagnostic systems 1012, including systems such as imaging system 10 described with reference to FIG. 1. In the embodiment illustrated in FIG. 8, the medical diagnostic systems include a magnetic resonance imaging (MRI) system 1014, a computed tomography (CT) system 1016, and an ultrasound imaging system 1018. The diagnostic systems may be positioned in a single location or facility, such as a medical facility 1020, or may be remote from one another as shown in the case of ultrasound system 1018. The diagnostic systems are serviced from a centralized service facility 1022. Moreover, a plurality of field service units 1024 may be coupled in the service system for transmitting service requests, verifying service status, transmitting service data and so forth as described more fully below.

In the exemplary embodiment of FIG. 8, several different system modalities are provided with remote service by the service facility. Remote services include but are not limited to services, such as, remote monitoring, remote system control, immediate file access from remote locations, remote file storage and archiving, remote resource pooling, remote recording, and remote high speed computations. Remote services are provided to a particular modality depending upon the capabilities of the service facility, the types of diagnostic systems subscribing to service contracts with the facility, as well as other factors. In general, however, the present technique is particularly well suited to providing remote service to a wide variety of medical diagnostic system modalities, including MRI systems, CT systems, ultrasound systems, positron emission tomography (PET) systems, nuclear medicine systems, and so forth. Moreover, the various modality systems serviced in accordance with the present techniques may be of different type, manufacture, and model.

Depending upon the modality of the systems, various subcomponents or subsystems will be included. In the case of MRI system 1014, such systems will generally include a scanner, a control and signal detection circuit, a system controller, and an operator station. MRI system 1014 includes a uniform platform for interactively exchanging service requests, messages and data with service facility 1022 as described more fully below. MRI system 1014 is linked to a communications module 1032, which may be included in a single or separate physical package from MRI system 1014. In a typical system, additional components may be included in system 1014, such as a printer or photographic system for producing reconstructed images based upon data collected from the scanner.

Similarly, CT system 1016 will typically include a scanner, a signal acquisition unit, and a system controller. The scanner detects portions of x-ray radiation directed through a subject of interest. The controller includes circuitry for commanding operation of the scanner and for processing and reconstructing image data based upon the acquired signals. CT system 1016 is linked to a communications module 1048 for transmitting and receiving data for remote services. Moreover, like MRI system 1014, CT system 1016 will generally include a printer or similar device for outputting reconstructed images based upon data collected by the scanner.

In the case of ultrasound system 1018, such systems will generally include a scanner and data processing unit and a system controller. Ultrasound system 1018 is coupled to a communications module 1062 for transmitting service requests, messages and data between ultrasound system 1018 and service facility 1022.

Although reference is made herein generally to "scanners" in diagnostic systems, that term should be understood to include medical diagnostic data acquisition equipment generally, not limited to image data acquisition, as well as to picture archiving communications and retrieval systems, image management systems, facility or institution management systems, viewing systems and the like, in the field of medical diagnostics.

Where more than one medical diagnostic system is provided in a single facility or location, as indicated in the case of MRI and CT systems 1014 and 1016 in FIG. 8, these may be coupled to a management station 1070, such as in a radiology department of a hospital or clinic. The management station may be linked directly to controllers for the various diagnostic systems. The management system may include a computer workstation or personal computer 1072 coupled to the system controllers in an intranet configuration, in a file sharing configuration, a client/server arrangement, or in any other suitable manner. Moreover, management station 1070 will typically include a monitor 1074 for viewing system operational parameters, analyzing system utilization, and exchanging service requests and data between the facility 1020 and the service facility 1022. Input devices, such as a standard computer keyboard 1076 and mouse 1078, may also be provided to facilitate the user interface.

It should be noted that, alternatively, the management system, or other diagnostic system components, may be "stand-alone" or not coupled directly to a diagnostic system. In such cases, the service platform described herein, and some or all of the service functionality nevertheless be provided on the management system. Similarly, in certain applications, a diagnostic system may consist of a stand-alone or networked picture archiving communications and retrieval system or a viewing station provided with some or all of the functionality described herein.

The communication modules mentioned above, as well as workstation 1072 and field service units 1024 may be linked to service facility 1022 via a remote access network 1080. For this purpose, any suitable network connection may be employed. Presently preferred network configurations include both proprietary or dedicated networks, as well as open networks, such as the Internet. Data may be exchanged between the diagnostic systems, field service units, and remote service facility 1022 in any suitable format, such as in accordance with the Internet Protocol (IP), the Transmission Control Protocol (TCP), or other known protocols. Moreover, certain of the data may be transmitted or formatted via markup languages such as the HyperText Markup Language (HTML), or other standard languages. The presently preferred interface structures and communications components are described in greater detail below.

Within service facility 1022, messages, service requests and data are received by communication components as indicated generally at reference numeral 1082. Components 1082 transmit the service data to a service center processing system, represented generally at reference numeral 1084 in FIG. 8. The processing system manages the receipt, handling and transmission of service data to and from the service facility. In general, processing system 1084 may include one or a plurality of computers, as well as dedicated hardware or software servers for processing the various service requests and for receiving and transmitting the service data as described more fully below.

Service facility 1022 also includes a bank of operator workstations 1086 which may be staffed by personnel who address the service requests and provide off and on-line service to the diagnostic systems in response to the service requests. Also, processing system 1084 may be linked to a system of databases or other processing systems 1088 at or remote from the service facility 1022. Such databases and processing systems may include extensive database information on operating parameters, service histories, and so forth, both for particular subscribing scanners, as well as for extended populations of diagnostic equipment.

Figure 9:
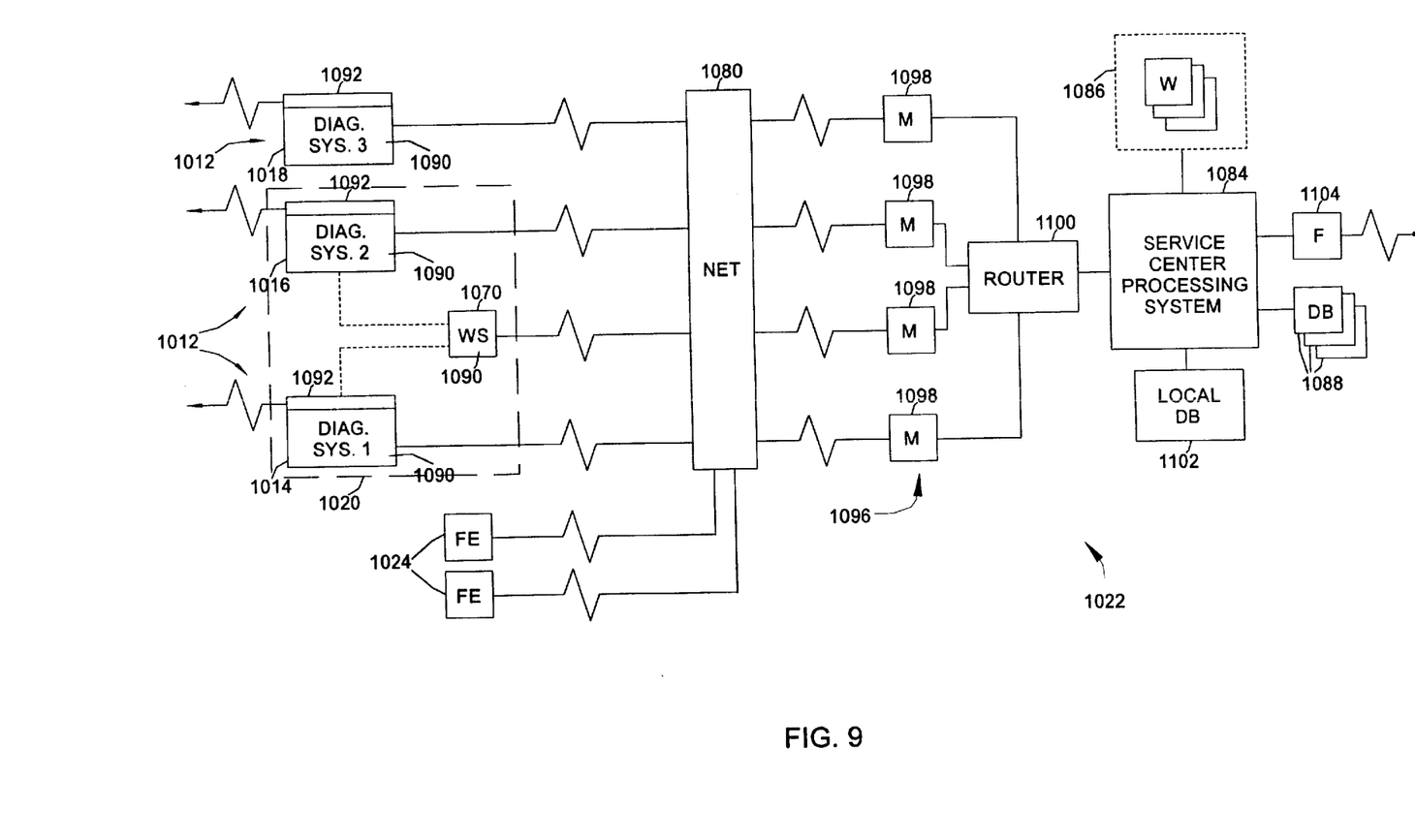
FIG. 9 is a block diagram of the systems shown in FIG. 8 illustrating certain functional components of the diagnostic systems and the service facility.

FIG. 9 is a block diagram illustrating the foregoing system components in a functional view. As shown in FIG. 9, the field service units 1024 and the diagnostic systems 1012 can be linked to the service facility 1022 via a network connection as illustrated generally at reference numeral 1080. Within each diagnostic system 1012, a uniform service platform 1090 is provided.

Platform 1090, which is described in greater detail below with particular reference to FIG. 10, includes hardware, firmware, and software components adapted for composing service requests, transmitting and receiving service data, establishing network connections and managing financial or subscriber arrangements between diagnostic systems and the service facility. Moreover, the platforms provide a uniform graphical user interface at each diagnostic system, which can be adapted to various system modalities to facilitate interaction of clinicians and radiologists with the various diagnostic systems for service functions. The platforms enable the scanner designer to interface directly with the control circuitry of the individual scanners, as well as with memory devices at the scanners, to access image, log and similar files needed for rendering requested or subscribed services. Where a management station 1070 is provided, a similar uniform platform is preferably loaded on the management station to facilitate direct interfacing between the management station and the service facility. In addition to the uniform service platform 1090, each diagnostic system is preferably provided with an alternative communications module 1092, such as a facsimile transmission module for sending and receiving facsimile messages between the scanner and remote service facilities.

Messages and data transmitted between the diagnostic systems and the service facility traverse a security barrier or "firewall" contained within processing system 1084 as discussed below, which prevents unauthorized access to the service facility in a manner generally known in the art. A modem rack 1096, including a series of modems 1098, receives the incoming data, and transmits outgoing data through a router 1100 which manages data traffic between the modems and the service center processing system 1084.

In the diagram of FIG. 9, operator workstations 1086 are coupled to the processing system, as are remote databases or computers 1088. In addition, at least one local service database 1102 is provided for verifying license and contract arrangements, storing service record files, log files, and so forth. Moreover, one or more communication modules 1104 are linked to processing system 1084 to send and receive facsimile transmissions between the service facility and the diagnostic systems or field service units.

Figure 10:
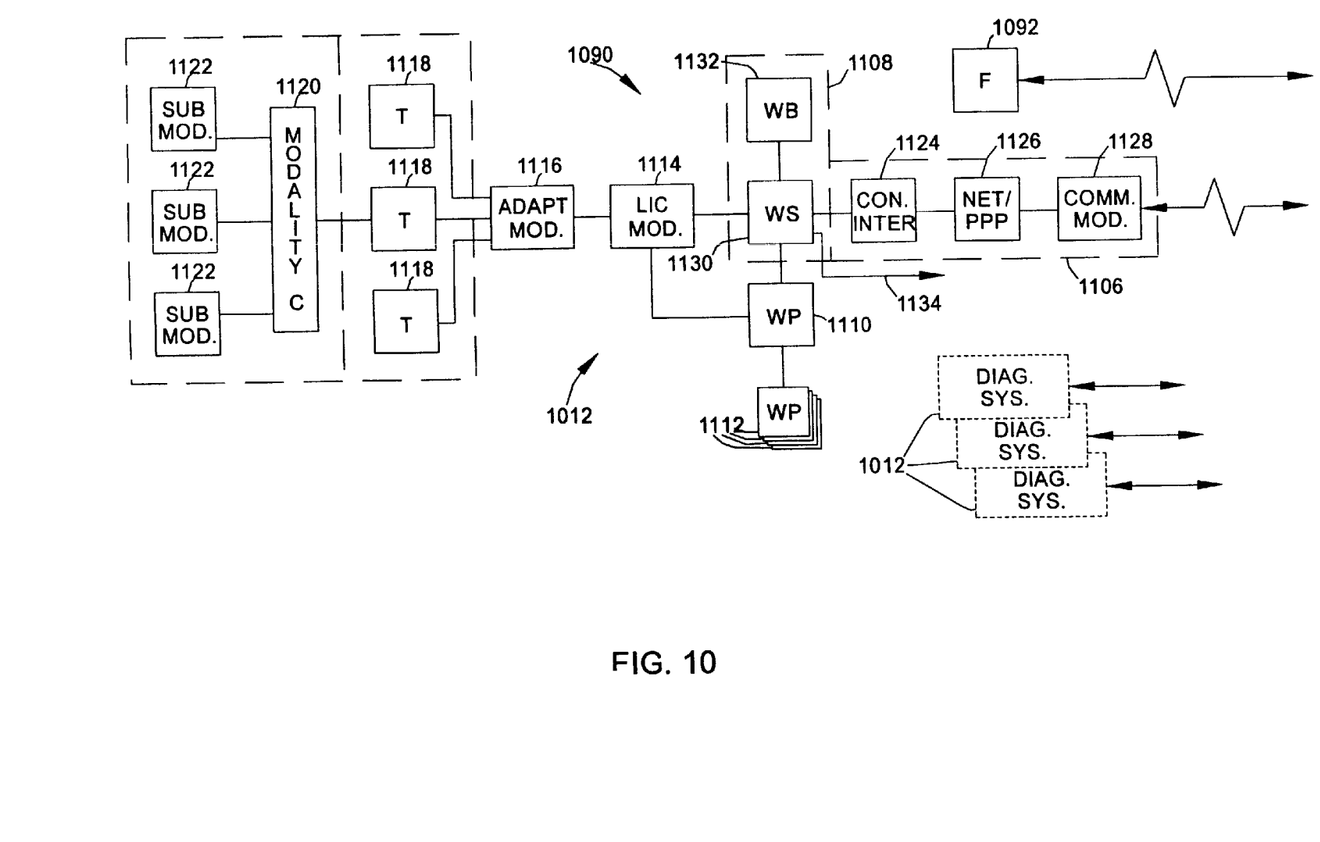
FIG. 10 is a block diagram of certain functional components within a diagnostic system of the type shown in FIG. 8 and FIG. 9 for facilitating interactive remote servicing of the diagnostic system.

FIG. 10 illustrates diagrammatically the various functional components comprising the uniform service platform 1090 within each diagnostic system 1012. As shown in FIG. 10, the uniform platform includes a device connectivity module 1106, as well as a network connectivity module 1108. Network connectivity module 1108 accesses a main web page 1110 which, as mentioned above, is preferably a markup language page, such as an HTML page displayed for the system user on a monitor at the diagnostic system. Main web page 1110 is preferably accessible from a normal operating page in which the user will configure examination requests, view the results of examinations, and so forth such as via an on-screen icon. Through main web page 1110, a series of additional web pages 1112 are accessible. Such web pages permit remote service requests to be composed and transmitted to the remote service facility, and facilitate the exchange of other messages, reports, software, protocols, and so forth as described more fully below.

It should be noted that as used herein the term "page" includes a user interface screen or similar arrangement which can be viewed by a user of the diagnostic system, such as screens providing graphical or textual representations of data, messages, reports and so forth. Moreover, such pages may be defined by a markup language or a programming language such as Java, per, java script, or any other suitable language.

Network connectivity module 1108 is coupled to a license module 1114 for verifying the status of license, fee or contractual subscriptions between the diagnostic system and the service facility. As used herein, the term "subscription" should be understood to include various arrangements, contractual, commercial or otherwise for the provision of services, information, software, and the like, both accompanies with or without payment of a fee. Moreover, the particular arrangements manages by systems as described below may include several different types of subscriptions, including time-expiring arrangements, one-time fee arrangements, and so-called "pay per use" arrangements, to mention but a few.

License module 1114 is, in turn, coupled to one or more adapter utilities 1116 for interfacing the browser, server, and communications components with modality interface tools 1118. In a presently preferred configuration, several such interface tools are provided for exchanging data between the system scanner and the service platform. For example, modality interface tools 1118 may include applets or servlets for building modality-specific applications, as well as configuration templates, graphical user interface customization code, and so forth. Adapters 1116 may interact with such components, or directly with a modality controller 1120 which is coupled to modality-specific subcomponents 1122.

The modality controller 1120 and modality-specific subcomponents 1122 will typically include a preconfigured processor or computer for executing examinations, and memory circuitry for storing image data files, log files, error files, and so forth. Adapter 1116 may interface with such circuitry to convert the stored data to and from desired protocols, such as between the HyperText Transfer Protocol (HTTP) and DICOM, a medical imaging standard for data presentation. Moreover, transfer of files and data as described below may be performed via any suitable protocol, such as a file transfer protocol (FTP) or other network protocol.

In the illustrated embodiment, device connectivity module 1106 includes several components for providing data exchange between the diagnostic system and the remote service facility. In particular, a connectivity service module 1124 provides for interfacing with network connectivity module 1108. A Point-to-Point Protocol (PPP) module 1126 is also provided for transmitting Internet Protocol (IP) packets over remote communication connections. Finally, a modem 1128 is provided for receiving and transmitting data between the diagnostic system and the remote service facility. As will be appreciated by those skilled in the art, various other network protocols and components may be employed within device connectivity module 1106 for facilitating such data exchange.

Network connectivity module 1108 preferably includes a server 1130 and a browser 1132. Server 1130 facilitates data exchange between the diagnostic system and the service facility, and permits a series of web pages 1110 and 1112 to be viewed via browser 1132. In a presently preferred embodiment, server 1130 and browser 1132 support HTTP applications and the browser supports java applications. Other servers and browsers, or similar software packages may, of course, be employed for exchanging data, service requests, messages, and software between the diagnostic system, the operator and the remote service facility. Finally, a direct network connection 1134 may be provided between server 1130 and an operator workstation, such as management station 1070 within the medical facility (see FIGS. 8 and 9).

In a present embodiment, the components comprising network connectivity module may be configured via an application stored as part of the uniform platform. In particular, a Java application licensed to a service engineer enables the engineer to configure the device connectivity at the diagnostic system to permit it to connect with the service facility.

Figure 11:
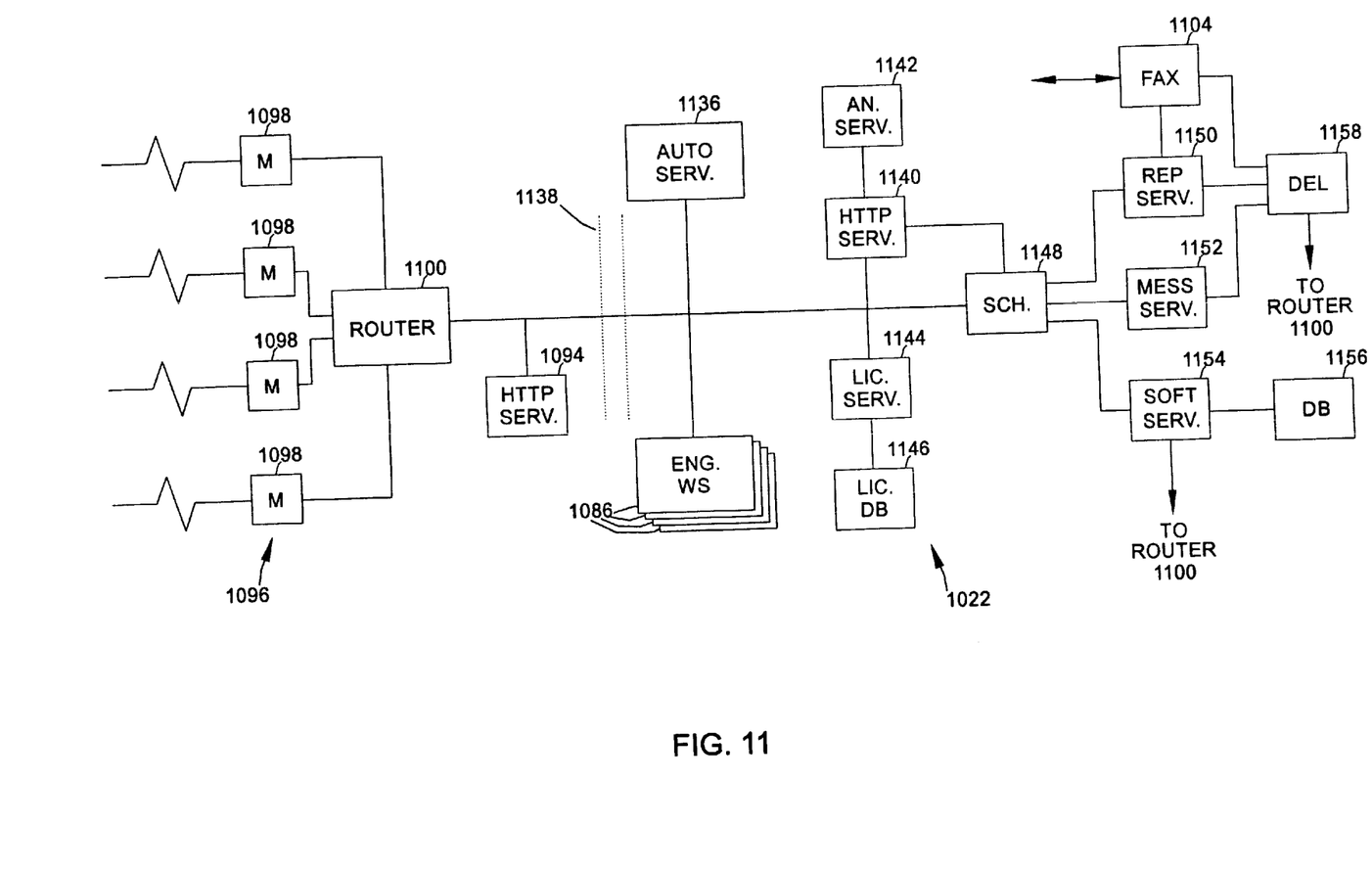
FIG. 11 is a block diagram of certain of the functional components of the service facility illustrated in FIG. 8 and FIG. 9 for rendering interactive remote service to a plurality of medical diagnostic systems.

FIG. 11 illustrates exemplary functional components for service facility 1022. As indicated above, service facility 1022 includes a modem rack 1096 comprising a plurality of modems 1098 coupled to a router 1100 for coordinating data communications with the service facility. An HTTP service server 1094 receives and directs incoming and outgoing transactions with the facility. Server 1094 is coupled to the other components of the facility through a firewall 1138 for system security. Operator workstations 1086 are coupled to the port manager for handling service requests and transmitting messages and reports in response to such requests.

An automated service unit 1136 may also be included in the service facility for automatically responding to certain service requests, sweeping subscribing diagnostic systems for operational parameter data, and so forth, as described below. In a presently preferred embodiment, the automated service unit may operate independently of or in conjunction with the interactive service components comprising processing system 1084. It should be noted that other network or communications schemes may be provided for enabling the service facility to communicate and exchange data and messages with diagnostic systems and remote service units, such as systems including outside Internet service providers (ISP's), virtual private networks (VPN's) and so forth.

Behind firewall 1138, an HTTP application server 1140 coordinates handling of service requests, massaging, reporting, software transfers and so forth. Other servers may be coupled to HTTP server 1140, such as service analysis servers 1142 configured to address specific types of service requests, as described more fully below. In the illustrated embodiment, processing system 1084 also includes a license server 1144 which is coupled to a license database 1146 for storing, updating and verifying the status of diagnostic system service subscriptions. Alternatively, where desired, license server 1144 may be placed outside of fire wall 1138 to verify subscription status prior to admission to the service facility.

Handling of service requests, massaging, and reporting is further coordinated by a scheduler module 1148 coupled to HTTP server 1140. Scheduler module 1148 coordinates activities of other servers comprising the processing system, such as a report server 1150, a message server 1152, and a software download server 1154. As will be appreciated by those skilled in the art, servers 1150, 1152 and 1154 are coupled to memory devices (not shown) for storing data such as addresses, log files, message and report files, applications software, and so forth. In particular, as illustrated in FIG. 11, software server 1154 is coupled via one or more data channels to a storage device 1156 for containing transmittable software packages which may be sent directly to the diagnostic systems, accessed by the diagnostic systems, or supplied on pay-per-use or purchase basis. Message and report servers 1152 and 1150 are further coupled, along with communications module 1104, to a delivery handling module 1158, which is configured to receive outgoing messages, insure proper connectivity with diagnostic systems, and coordinate transmission of the messages.

In a presently preferred embodiment, the foregoing functional circuitry may be configured as hardware, firmware, or software on any appropriate computer platform. For example, the functional circuitry of the diagnostic systems may be programmed as appropriate code in a personnel computer or workstation either incorporated entirely in or added to the system scanner. The functional circuitry of the service facility may include additional personal computers or workstations, in addition to a main frame computer in which one or more of the servers, the scheduler, and so forth, are configured. Finally, the field service units may comprise personal computers or laptop computers of any suitable processor platform. It should also be noted that the foregoing functional circuitry may be adapted in a variety of manners for executing the functions described herein. In general, the functional circuitry facilitates the exchange of remote service data between the diagnostic systems and a remote service facility, which is preferably implemented in an interactive manner to provide regular updates to the diagnostic systems of service activities.

As described above, both the diagnostic systems and the field service units preferably facilitate interfacing between a variety of diagnostic system modalities and the remote service facility via a series of interactive user-viewable pages. Exemplary pages include capabilities of providing interactive information, composing service requests, selecting and transferring messages, reports and diagnostic system software, and so forth. Pages facilitate the interaction and use of remote services, such as, remote monitoring, remote system control, immediate file access from remote locations, remote file storage and archiving, remote resource pooling, remote recording, and remote high speed computations.

The user can access specific documents described in text areas of the pages by selection of all or a portion of the text describing the documents. In the presently preferred embodiment, the accessed documents may be stored in local memory devices within the diagnostic system, or selection of the text may result in loading of a uniform resource locator (URL) for accessing a remote computer or server via a network link.

Advantageously, service system 1010 (FIG. 8) provides remote services, such as, remote control, remote monitoring, remote diagnostics, resource pooling, and remote storage. Service system 1010 incorporating imaging system 10 provides for processing and sorting of half-lines of pixel data over a network for faster and more efficient data communication and image display at remote locations. Remote services provided by service system 1010 are enhanced by the half-line processing and sorting techniques described herein. A variety of matrix formats are made possible and processing speeds of the images are increased.

While the embodiments illustrated in the Figures and described above are presently preferred, it should be understood that the embodiments are offered by way of example only. Those skilled in the art will also recognize that by altering the base address and offset values utilized in determining the half-line storage addresses, the present technique can easily be adapted to accommodate various image matrix dimensions, as well as various scanning modes, including both inside-to-outside sequences and outside-to-inside sequences. Moreover, the technique provides a particularly computationally efficient system wherein contiguous full lines of pixel data may be obtained in real-time as the half-lines of data are transmitted to the signal processing circuitry. The system is easily reconfigurable by inputting specific matrix size selections and scanning mode selections via display/output/input station 28. The invention is not limited to a particular embodiment, but extends to various modifications, combinations, and permutations that nevertheless fall within the scope and spirit of the appended claims.

What is claim is:

1. A method for processing partial lines of image data from a detector, each partial line of data representing a portion of an image pixel matrix, the method comprising the steps of:
   (a) communicating partial lines of image data over a network from an imaging system to a remote facility;
   (b) receiving the partial lines of image data in a first data sequence;
   (c) assigning to each partial line of image data in a first series a position in a second data sequence by reference to a plurality of base addresses;

(d) altering the base addresses; and (e) assigning to each partial line of image data in a second series a position in the second data sequence by reference to the altered base addresses.

2. The method of claim 1, wherein positions of each partial line of image data in the second data sequence corresponds to an address in a memory circuit.

3. The method of claim 1, wherein the base addresses are generated as a function of pixel dimensions of the image pixel matrix.

4. The method of claim 1, wherein the base addresses are altered by reference to offset values stored in a memory circuit.

5. The method of claim 4, wherein the offset values are generated as a function of pixel dimensions of the image pixel matrix and the first data sequence.

6. The method of claim 1, wherein the first data sequence corresponds to a scanning pattern of the image pixel matrix from peripheral edges of the matrix to an inner location thereof.

7. The method of claim 1, wherein the base addresses are altered as a function of dimensions of the image pixel matrix.

8. A method for processing a discrete pixel image, the image including a plurality of pixels disposed in an image pixel matrix, the method comprising the steps of:

(a) communicating the image pixel matrix over a network from an imaging system to a remote facility;

(b) determining address values based upon dimensions of the image pixel matrix and a desired pixel scanning data sequence;

(c) generating a plurality of series of image data for pixels in the image pixel matrix; and (d) altering the address values; and (e) assigning to each series of image data a unique address value corresponding to a desired pixel output data sequence.

9. The method of claim 8, wherein the address values are determined by determining a plurality of base address values and a plurality of offset values based upon the dimensions of the image pixel matrix and on the desired pixel scanning data sequence.

10. The method of claim 9, wherein the base address values are stored in a base address table and the offset values are stored in an offset table.

11. The method of claim 9, wherein the base address values and the offset values are combined to determine address values for each series of image data in at least first and second groups.

12. The method of claim 11, wherein each series of image data is assigned an address value of the first group, and each subsequent series of image data is assigned an address value of the second group based upon a counter value.

13. The method of claim 8, wherein each series corresponds to a partial line of pixels in the image pixel matrix.

14. The method of claim 8, wherein the dimensions of the image pixel matrix are set by operator selection.

15. The method of claim 8, wherein the desired pixel scanning sequence is set by operator selection.

16. A system for processing partial lines of image data representative of discrete pixels in an image pixel matrix, the system comprising:

a network for communication among at least one imaging system and at least one remote facility;

a first memory circuit coupled to the network for storing operator configurable address values corresponding to a desired data sequence of the partial lines of image data;

a second memory circuit coupled to the network for storing the partial lines of image data in the desired data sequence; and a signal processing circuit coupled to the network configured to assign to each partial line of image data an address value from the first memory circuit, to alter address valves and to store the partial lines of image data in the second memory circuit according to the assigned address values.

17. The system of claim 16, wherein the first memory circuit stores a plurality of base address values and offset values corresponding to a plurality of image pixel matrix dimensions.

18. The system of claim 17, wherein the offset values are based on a predetermined image scanning data sequence.

19. The system of claim 18, wherein offset values are stored in the first memory circuit based on a plurality of predetermined image scanning sequences.

20. The system of claim 16, further comprising a counter, the signal processing circuit being configured to increment the counter for each partial line of image data assigned an address value from the first memory circuit.

* * * * *